Patented May 3, 1927.

1,626,814

UNITED STATES PATENT OFFICE.

FRED E. GOODALL, OF CHICAGO, ILLINOIS, ASSIGNOR, BY MESNE ASSIGNMENTS, TO VAN ESS LABORATORIES, INC., OF CHICAGO, ILLINOIS, A CORPORATION OF DELAWARE.

SKIN CREAM.

No Drawing.      Application filed November 9, 1925. Serial No. 67,759.

This invention relates to a skin cream having especially beneficial properties for treating the skin.

I have found that a skin cream containing cottonseed oil that has previously been treated with ultra-violet light has beneficial properties when applied to the skin. The treated cottonseed oil apparently destroys the bacteria of the skin and leaves the skin in a highly resistant state, preventing the occurrence of black heads and other common skin troubles, as well as the more serious skin diseases such as rash and eczema.

It is therefore an object of this invention to provide a preparation for the skin that will have certain beneficial and healing properties.

Other and further important objects of this invention will be apparent from the disclosures in the specification and the appended claims.

The main ingredient of the skin cream of my invention is cottonseed oil that has previously been treated with ultra-violet rays. Ordinarily, cottonseed oil would not be a desirable component of skin creams but after treating it with ultra-violet light, it has been found to have a very beneficial effect upon the skin. The ray treatment not only renders the cotton seed oil sterile, but it also apparently activates it to the extent that it is capable of killing or destroying skin bacteria. The cottonseed oil after treatment may be mixed with a suitable ingredients such as beeswax, spermaceti and mineral oil to give the desired consistency of the cream.

My preferred composition of cream is approximately as follows:

| | Parts. |
|---|---|
| Beeswax | 30 |
| Spermaceti | 2.5 |
| Cottonseed oil | 72 |
| Mineral oil | 8 |
| Borax | .6 |
| Water | 50 |

To which may be added vegetable coloring and perfume to suit, the whole being compounded in the usual manner to form a smooth cream.

It is obvious, however, that the proportions may be varied over a considerable range and that suitable substances commonly used in cream preparations for the skin may be substituted for those given, provided that the treated cottonseed oil is retained as the essential element of the composition. I therefore do not purpose limiting the patent granted hereon, otherwise than necessitated by the prior art.

I claim as my invention:

1. A preparation for use as a skin cream comprising beeswax, spermaceti, mineral oil and cottonseed oil which has been treated with ultra-violet rays.

2. A skin cream containing cottonseed oil which has been previously treated with ultra-violet rays.

3. A skin cream mainly composed of cottonseed oil which has been treated with ultra-violet rays, beeswax, mineral oil and spermaceti, approximately in the proportion of 72 parts of cottonseed oil, 30 parts of beeswax, 8 parts of mineral oil and 2.5 parts of spermaceti.

4. A preparation for use as a skin cream comprising a waxy substance, a mineral oil and a vegetable oil that has been treated with ultra-violet rays.

In testimony whereof I have hereunto subscribed my name.

FRED E. GOODALL.